United States Patent [19]
Nadherny et al.

[11] Patent Number: 5,624,089
[45] Date of Patent: Apr. 29, 1997

[54] PIPE ANCHORING SYSTEM

[75] Inventors: Rudolph E. Nadherny, Naperville; Mark Kampf, Crystal Lake, both of Ill.

[73] Assignee: Ireco, Inc., Chicago, Ill.

[21] Appl. No.: 517,204

[22] Filed: Aug. 21, 1995

[51] Int. Cl.⁶ .................................................... E21F 17/02
[52] U.S. Cl. ............................................. 248/62; 248/74.4
[58] Field of Search ............................ 248/62, 74.1, 74.4, 248/71, 61, 58

[56] References Cited

U.S. PATENT DOCUMENTS

| | | |
|---|---|---|
| 2,546,792 | 3/1951 | Smith et al. . |
| 2,625,354 | 1/1953 | Smith . |
| 2,744,706 | 5/1956 | Gerdy ............................... 248/62 X |
| 2,891,752 | 6/1959 | Genter .................................. 248/71 |
| 3,330,516 | 7/1967 | Vincent ............................ 248/74.4 X |
| 3,353,775 | 11/1967 | Sebo .................................. 248/74.4 X |
| 4,222,538 | 9/1980 | Jensen et al. . |
| 4,601,450 | 7/1986 | Lindquist ............................... 248/71 |
| 4,767,087 | 8/1988 | Combû .................................. 248/62 |
| 5,284,267 | 2/1994 | Polletta et al. .................... 248/74.4 X |
| 5,370,344 | 12/1994 | Nadherny . |
| 5,395,079 | 3/1995 | Jensen et al. . |

FOREIGN PATENT DOCUMENTS

| | | | |
|---|---|---|---|
| 812529 | 5/1937 | France | 248/74.4 |
| 344090 | of 1931 | United Kingdom | 248/68 |

OTHER PUBLICATIONS

Declaration of Stephen H. Beals.

*Primary Examiner*—Korie Chan
*Attorney, Agent, or Firm*—Lockwood, Alex, Fitzgibbon & Cummings

[57] ABSTRACT

A system for anchoring a pipe, such as a train pipe, to the inside of an elongated right angle structural part or member, such as may be mounted on a sidewall of a rail car. The elongated right angle structural part has a plurality of spaced bolt receiving holes extending through one leg and a plurality of pipe anchor bases, with brackets fastened thereto, are attached to the right angle structural member by means of a single bolt extending through a bracket and one of the spaced bolt receiving holes. Each pipe anchor base may be of the general type found in known pipe anchors as disclosed, for example, in U.S. Pat. No. 2,546,792 dated Mar. 27, 1951, U.S. Pat. No. 2,625,354 dated Jan. 13, 1953 and U.S. Pat. No. 4,222,538 dated Sep. 16, 1980. Once a combined pipe anchor base and its bracket has been installed on the inside of the right angle structural part, relative movement between the bracket/anchor base combination and the structural part will be prevented. Each bracket will have an elongated opening in a portion thereof which engages one of the legs of the right angle structural part which opening will permit the insertion of a bolt through the bracket and through one of the holes in a leg of the structural part with a portion of the elongated opening registering with the bolt receiving hole.

6 Claims, 6 Drawing Sheets

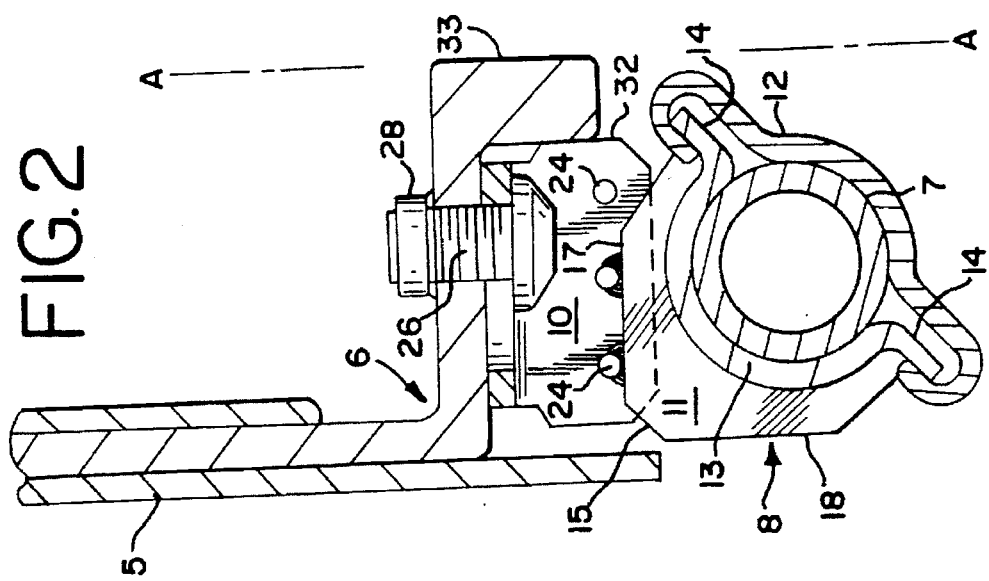
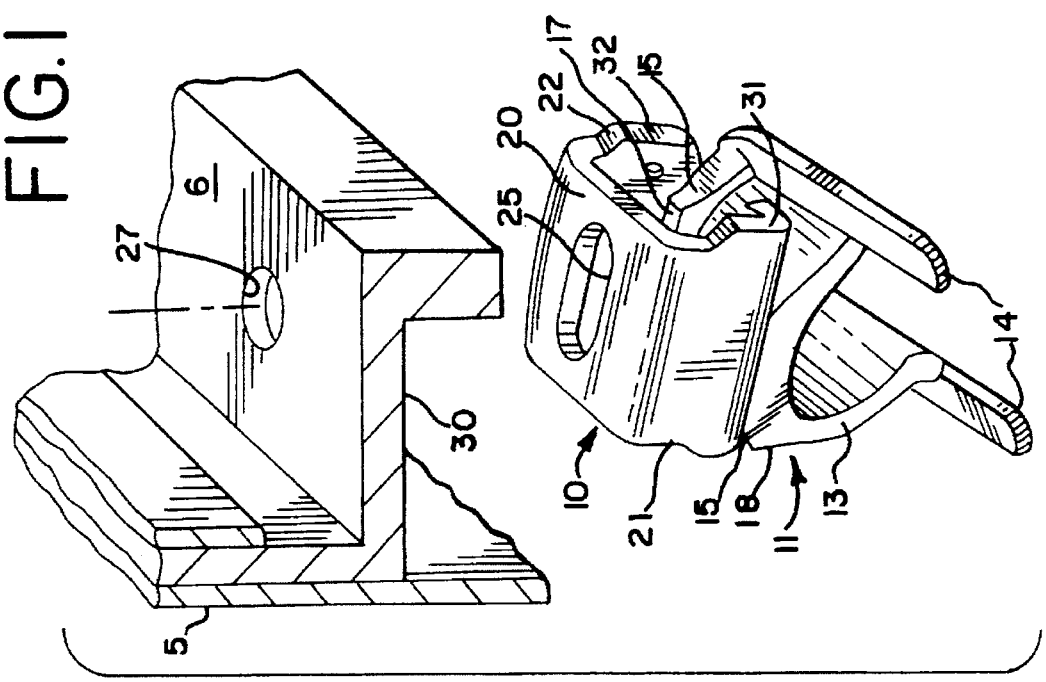

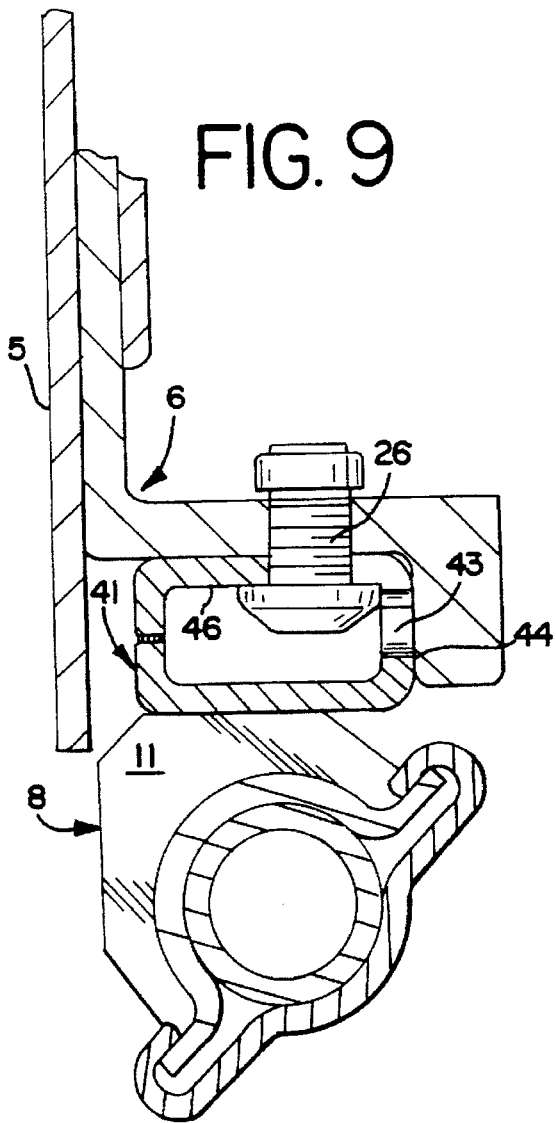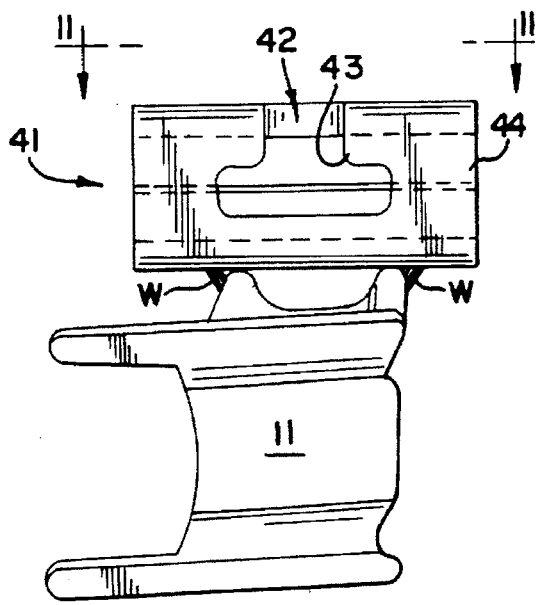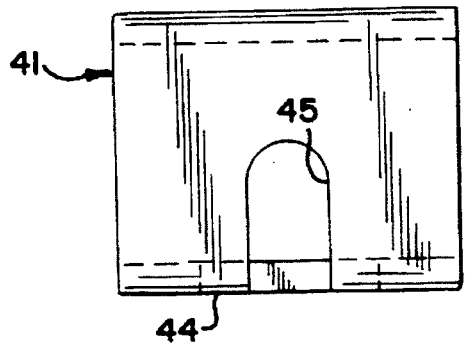

PIPE ANCHORING SYSTEM

BACKGROUND AND DESCRIPTION OF THE INVENTION

This invention relates, generally, to a system for anchoring a pipe or other similar elongated object to the inside of a right angle structural part, preferably in such manner that the pipe anchors and pipe anchored thereto do not extend transversely beyond the right angle structural part. The invention relates more particularly to railway cars having sidewalls which have side sills in the form of right angle structural members extending along a sidewall and a system of pipe anchors secured to the inside of the elongated right angle structural members with no parts of the pipe anchors extending from the rail car sidewall beyond the extent to which the right angle structural member extends.

The pipe anchors are of generally known type and comprise an anchor base and mating wedge clamp. Such pipe anchors are disclosed in U.S. Pat. No. 2,546,792 dated Mar. 27, 1951, U.S. Pat. No. 2,625,354 dated Jan. 13, 1953 and U.S. Pat. No. 4,222,538 dated Sep. 16, 1980.

Each pipe anchor of the system comprises a pipe anchor base to which is fastened a bracket by means of which each pipe anchor base can be mounted by a single bolt to the inside of the right angle structural member. One part of each bracket has an elongated bolt receiving opening which can be aligned with a bolt hole in one leg of the right angle structural member whereby a single bolt will suffice to attach each bracket and its attached anchor base in a manner which prevents appreciable relative movement between the anchor base and the right angle structural member or part.

The object of the invention, generally stated, is the provision of a system for anchoring a pipe or other similar elongated object to a right angle structural part or member at spaced locations therealong in such a manner that only a single bolt is used at each location to secure a pipe anchor to the right angle structural member with relative movement between a pipe anchor and the right angle structural part being prevented.

A further object of the invention is to provide such a system which utilizes known type pipe anchor bases and wedge clamps with attaching brackets permanently fastened to each anchor base so as to provide a ready-made combined part which may be readily installed at each desired location by use of a single bolt, preferably, a Huck type bolt.

For a more complete understanding of the nature and scope of the invention, reference may now be had to the following detailed description taken in conjunction with the accompanying drawings, wherein:

BRIEF DESCRIPTION OF THE DRAWINGS

FIG. 1 is an exploded perspective view showing one embodiment of the invention;

FIG. 2 is a longitudinal vertical sectional view through the embodiment of FIG. 1 showing the parts installed and secured in place by a single bolt;

FIG. 9 is a vertical sectional view, similar to FIG. 2, of an installation using a third embodiment of the invention;

FIG. 10 is a side elevational view similar to FIG. 4 of the anchor base and bracket fastened thereto shown in FIG. 9;

FIG. 11 is a plan view on line 11—11 of FIG. 10 of the bracket shown in FIG. 9;

Referring to FIGS. 1–3, the side wall of what may be a rail car is indicated at 5 having attached thereto a side sill in the form of an elongated right angle structural part or member indicated generally at 6. The side sill 6 in the embodiment shown serves as a hanger for a pipe 7 (FIG. 2) such for example as a train pipe.

Figure 3:
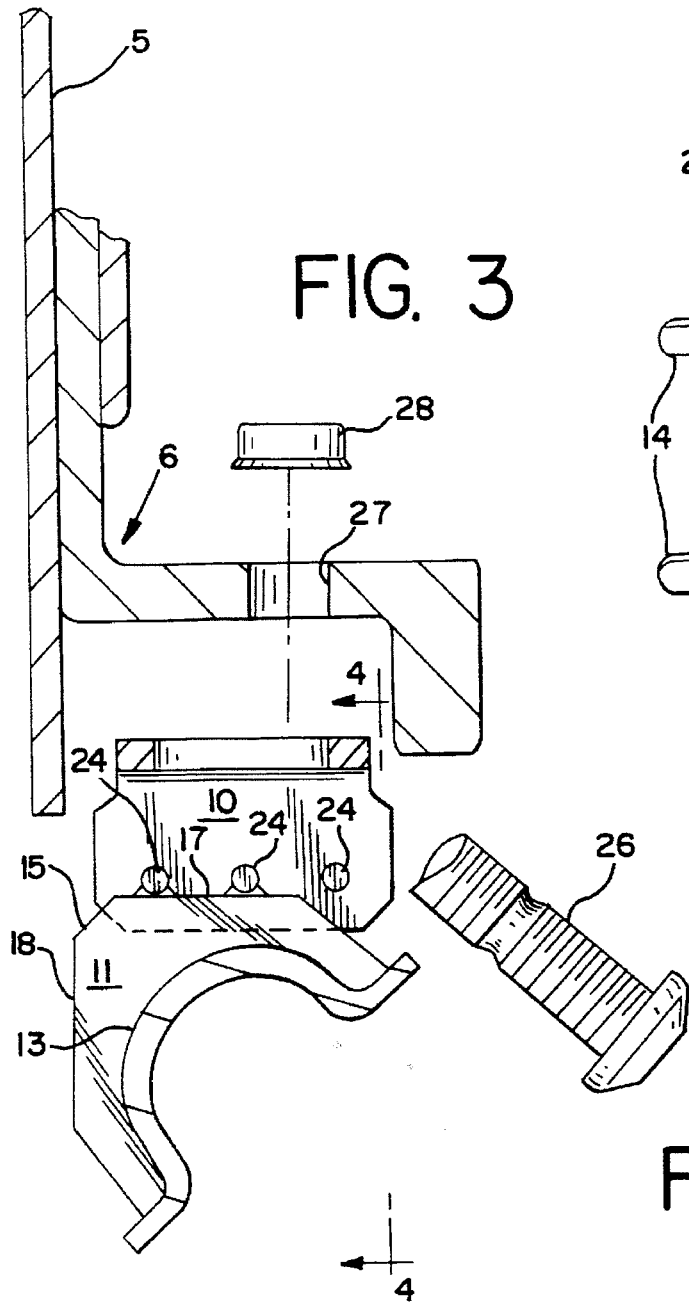
FIG. 3 is an exploded view corresponding to FIG. 2 minus the wedge clamp and pipe.

A ready-made unit or assembly for anchoring the pipe 7 to the structural part 6 at spaced locations therealong comprises a pipe anchor of known type indicated generally at 8 to which is fastened a connecting bracket indicated generally at 10. The pipe anchor 8 is of known general construction such as the pipe anchors shown in the above-mentioned patents. Thus, the pipe anchor 8 comprises a pipe anchor base indicated generally at 11 and a mating wedge clamp 12 (FIG. 2). The anchor base 11 has a longitudinally extending pipe receiving saddle portion in which the pipe 7 is seated and clamped by the wedge clamp 12. The anchor base 11 has a pair of longitudinally extending wedge clamp receiving and retaining flanges 14—14 projecting laterally on opposite sides. The manner in which the flanges or ears 14 cooperate with the wedge clamp 12 so as to firmly secure the pipe 7 in the anchor base 8 is well known.

Figure 4:
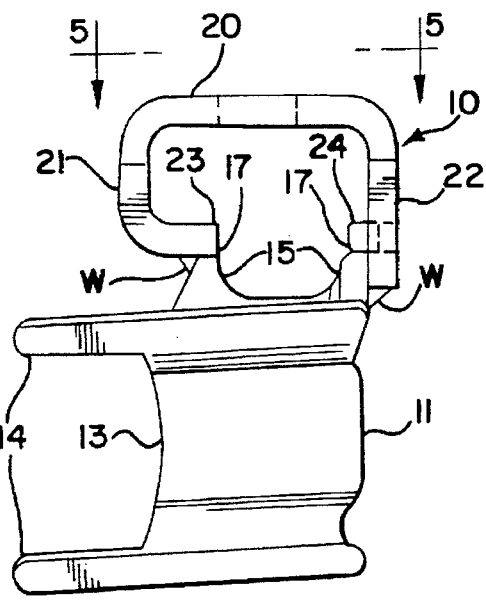
FIG. 4 is a side elevational view taken on line 4—4 of FIG. 3 of the anchor base with the connecting bracket fastened thereto.
Figure 5:
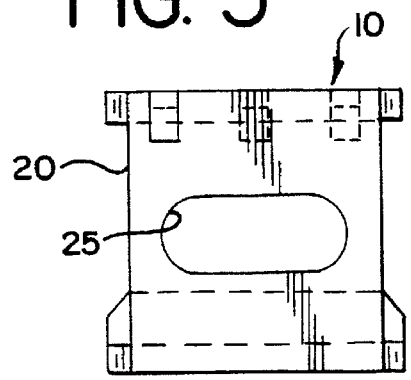
FIG. 5 is a plan view of the connecting bracket taken on line 5—5 of FIG. 4.

In the installation shown it is important that no part of the pipe hanger system extend or project past the vertical outer extremity of the right angle structural part 6 as represented by the vertical line A—A (FIG. 2). In order to comply with this requirement, the pipe anchor 8 is supported in a tilted orientation as shown. To obtain this orientation, the anchor base is provided with a pair of spaced transversely extending flanges 15—15 on opposite ends of the saddle portion 13. Each flange 15 has a pair or co-planar straight edges 17—17 and 18—18, respectively, to either of which pairs a connecting bracket 10 may be fastened as by welding as indicated at W—W (FIG. 4). By making the anchor base 11 symmetrical with respect to the two pairs of straight co-planar edges 17—17 and 18—18, the bracket 10 can be mounted on either pair of straight edges as desired. While the edges 17—17 and 18—18 form an angle of 45° with respect to a vertical center plane through the anchor base 8 the angle could be different such as 30° or 60°.

The bracket 10 is generally channel shaped with a top portion 20 and sidewalls 21 and 22. The sidewall 21 has an inturned lip 23 (FIG. 4) which rests on an edge 17 (or 18) of a flange 15. The opposite sidewall 22 projects downwardly over the outer side of the opposite flange 15 and is provided with three equally spaced integrally formed pins 24—24. The center pin 24 and one of the end pins 24 will rest on either one of the co-planar edges 17 or 18 depending upon which pair of edges the bracket 10 is mounted. By virtue of this available choice between edges 17—17 and 18—18, right-handed and left-handed ready-made assemblies can be provided so that the bendable tab like ends of the flanges 14 on the anchor base 11 may extend in either direction as desired when an anchor base/connector assembly is installed on the inside of the right angle structural member or part 6. This permits the wedge clamps 12 to be installed in opposite directions which may be a desirable feature with elongated installations.

The top portion 20 of the connector bracket 10 is provided with an elongated opening 25 for receiving the stem of a bolt 26. The elongated opening 25 allows the bolt 26 to be inserted upwardly at an angle through the opening 25 and also allows a portion of the opening 25 to register or align with a bolt receiving hole 27 (FIG. 1) in the horizontal leg of the right angle structural part 6. For ease of installation it is usually preferred to use Huck bolts which can be securely and rapidly installed by swaging a collar 28 in known manner to the stem of the bolt after the bolt head has been drawn up against the underside of the top portion 20 of the bracket 10 as shown in FIG. 2. Thereafter, the projecting end of the bolt 10 is broken off resulting in a permanent installation which does not permit relative movement between the bracket 10 and the member 6 and which does not become loosened in use.

While the top portion 20 of the bracket 10 is drawn up snugly against the underside of the horizontal leg 30 of the right angle structural part 6, the vertical edges 31 and 32 on the sidewalls 21 and 22, respectively, of the bracket 10 either engage or are juxtaposed to the inner vertical surface of the vertical leg 33 of the structural part 6 as shown in FIG. 2. With the bracket 10 secured in this manner within the right angle structural part 6 it will be seen that relative movement between the bracket 10 and the right angle structural part 6 is prevented.

Figure 6:
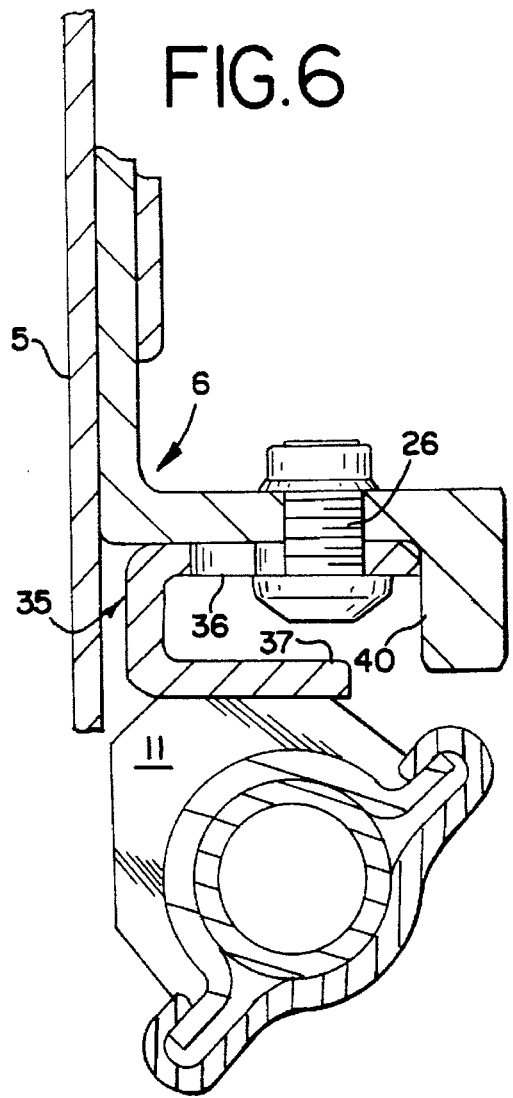
FIG. 6 is a vertical sectional view, similar to FIG. 2, of an installation using a second embodiment of the invention.
Figure 7:
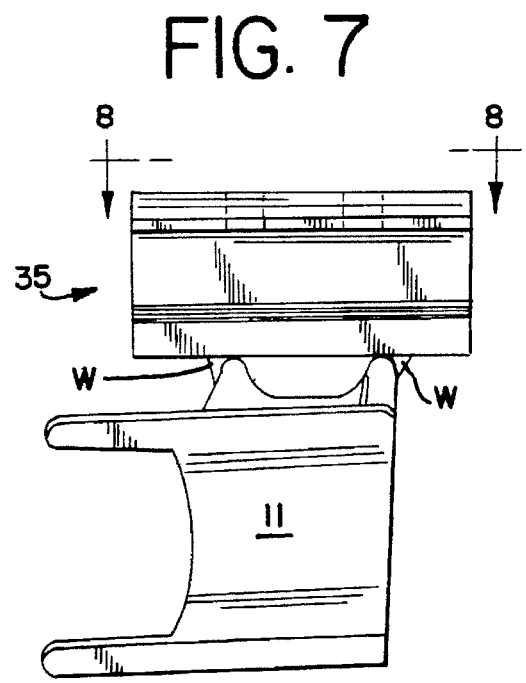
FIG. 7 is a side elevational view similar to FIG. 4 of the anchor base and connecting bracket attached thereto shown in FIG. 6.
Figure 8:
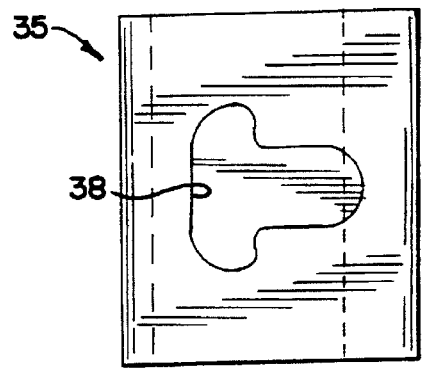
FIG. 8 is a plan view on line 8—8 of FIG. 7 of the bracket fastened to the anchor base as shown in FIG. 6.

Referring to FIGS. 6–8, a second embodiment of the invention is shown therein wherein all parts of the installation are the same as in the first embodiment shown in FIGS. 1–5 except for the bracket indicated generally at 35 which serves to connect the pipe anchor base 11 to the right angle structural part 6. Accordingly, all parts in FIGS. 6–8 have the same reference numerals as in FIGS. 1–5 except for the bracket 35. The bracket 35 is generally U-shaped with its upper leg 36 being somewhat longer than its bottom leg 37. The bottom leg 37 rests on both co-planar edges 17 (or 18) of the flanges 15 and is preferably welded thereto as indicated at W—W in FIG. 7. The upper leg 36 has a generally T-shaped bolt-receiving opening 38. The T-shaped opening allows the bolt 26 to be inserted upwardly into and through the upper side 36 of the bracket 35 and then shifted so that the bolt occupies the portion of the opening 38 which is brought into alignment or registration with the hole 27 in the horizontal leg 30 of the right angle structural member 6. With the assembly installed as shown in FIG. 6, the free right hand edge of the upper leg 36 of the bracket 35 either engages or is juxtaposed to the inside vertical side 40 of the vertical leg 33. This interengagement or juxtaposition prevents relative movement between the bracket 35 and the right angle structural part 6 once the assembly has been installed and the bolt 26 tightened.

Referring to FIGS. 9–11, a third embodiment of the invention is shown therein which differs from the first embodiment of FIGS. 1–5 in having a different connecting bracket which is indicated generally at 41. The bracket 41 is rectangular in cross section and may be formed by punching and bending a piece of steel or other metal. The bolt receiving opening indicated generally at 42 comprises a T-shaped portion 43 (FIG. 10) in the vertical leg 44 of the bracket 41 and an elongated portion 45 (FIG. 11) in the upper side 46 of the bracket 41.

It will be seen that the opening 42 permits the bolt 26 to be inserted sidewise into the bracket 41 so that the bolt head engages the underside of the top 46 of the bracket and placed in a location in the end of the slot 45 which is in registration with the hole 27 in the right angle structural part 6. Since the right hand side 44 of the bracket 41 is either juxtaposed to or in engagement with the inner side of the vertical leg 33 of the structural part 6, rotation or movement of the bracket 41 and the pipe anchor 8 secured thereto relative to part 6 is prevented once the assembly is in place with the bolt 26 fully tightened.

Figure 12:
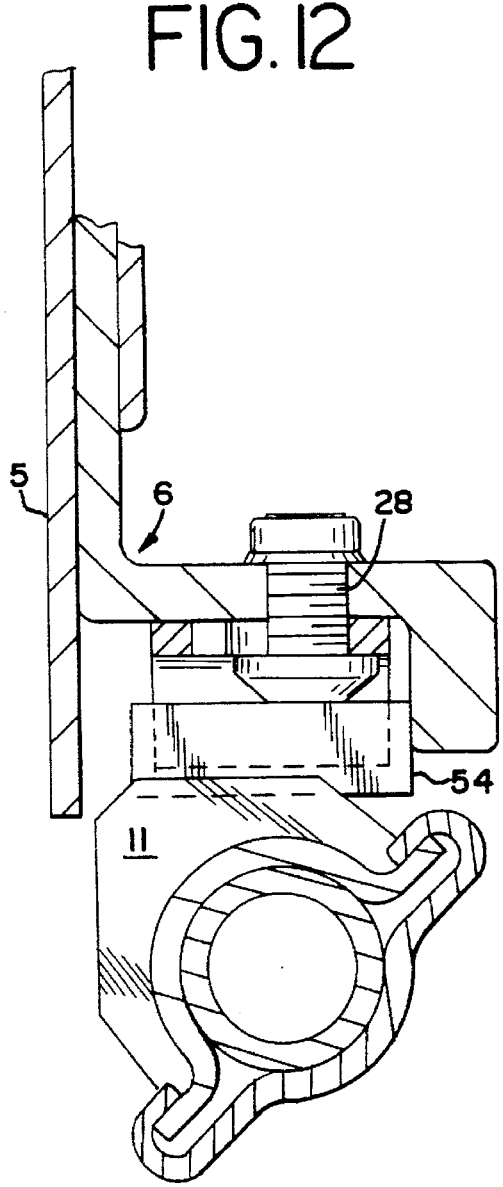
FIG. 12 is a vertical sectional view corresponding to FIG. 2 of an installation using a fourth embodiment of the invention.
Figure 13:
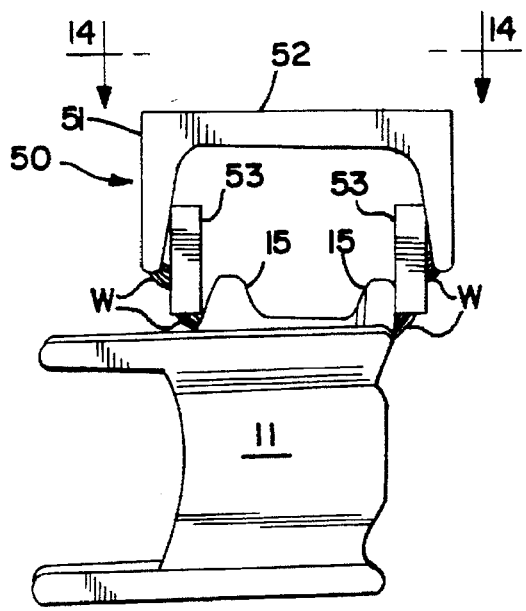
FIG. 13 is a side elevational view similar to FIG. 4 of the anchor base and bracket fastened thereto as shown in FIG. 12.
Figure 14:
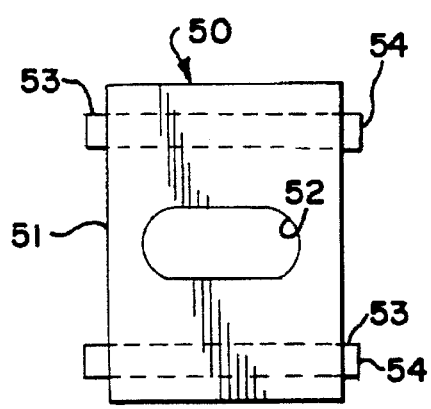
FIG. 14 is a plan view on line 14—14 of FIG. 13.

Referring to FIGS. 12–14, a fourth embodiment of the invention is shown therein which differs from the first embodiment shown in FIGS. 1–5 in having a different connecting bracket indicated generally at 50. The bracket 50 comprises a channel shaped saddle 51 having an elongated opening 52 in the top. A pair of vertical strips 53 are welded to the insides of the vertical legs of the saddle 51 and these strips, in turn, are welded as indicated at W—W to the outer sides of the flanges 15 on the anchor base 11.

The elongated slot 52 permits the insertion of the bolt 26 into the assembly with the bolt head engaging the underside of the saddle 51 as shown in FIG. 12. With the assembly in place as shown in FIG. 12, the ends 54 of the strips 53 either engage or are juxtaposed to the inside of the vertical leg 33 of the right angle structural part 6. As in the other embodiments with the assembly in place and the bolt 26 tightened, relative movement between the bracket 50 and the right angle structural part 6 is prevented.

Figure 16:
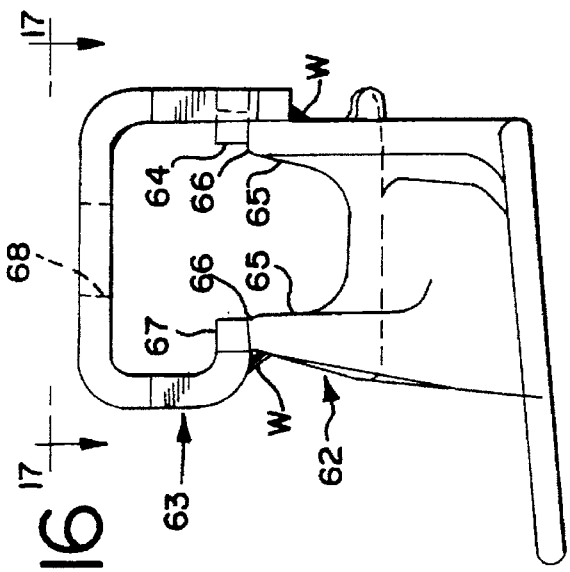
FIG. 16 is a side elevational view similar to FIG. 4 of the anchor base and bracket fastened thereto as shown in FIG. 15.
Figure 17:
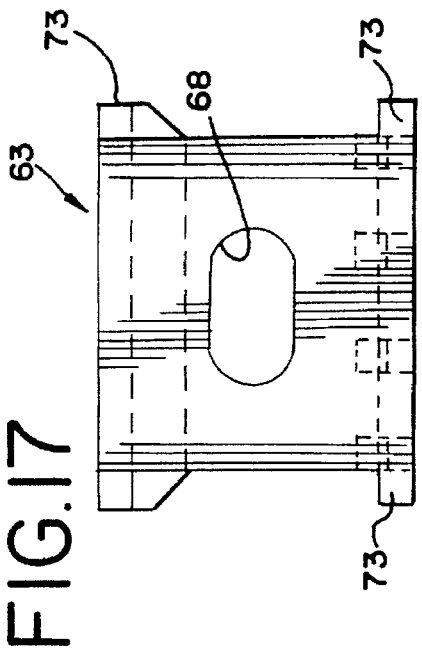
FIG. 17 is a plan view on line 17—17 of FIG. 16.
Figure 15:
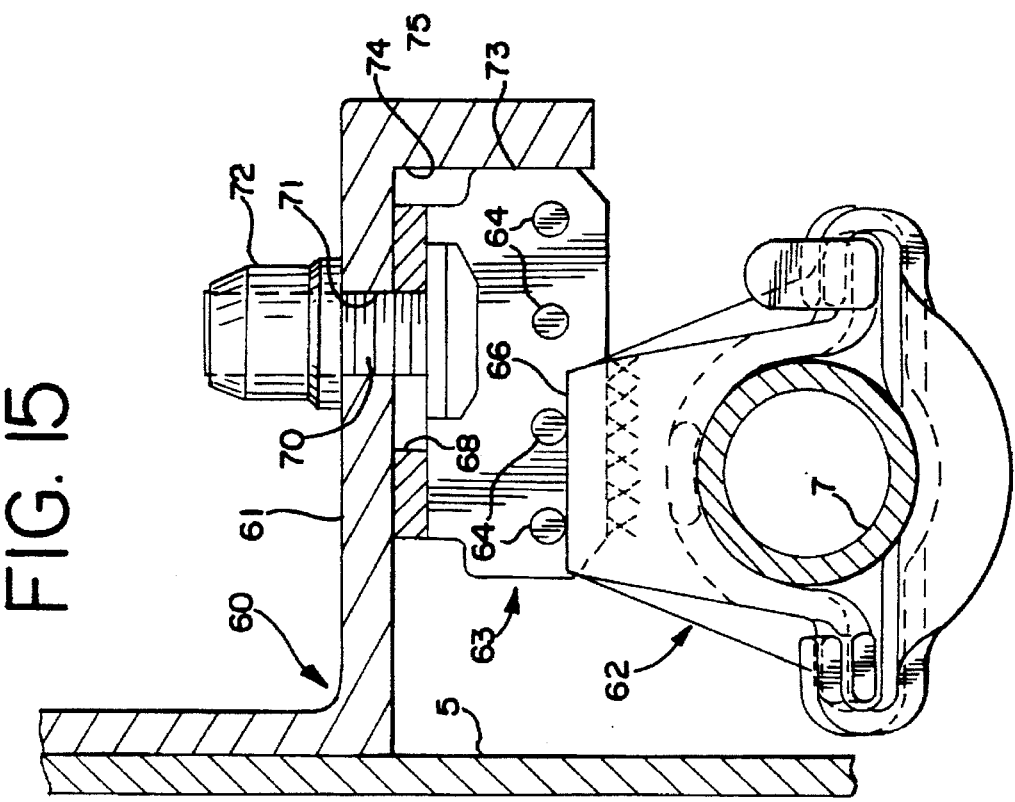
FIG. 15 is a vertical sectional view corresponding to FIG. 2 of an installation using a fifth embodiment of the invention.

Referring to FIGS. 15–17, a fifth embodiment of the invention is shown therein which differs from the first embodiment shown in FIGS. 1–5 and from the embodiments shown in FIGS. 6–14 in three respects. First, the right angle structural part indicated generally at 60 therein has a horizontal leg 61 which is longer than the horizontal leg of right angle structural part 6. Second, the pipe anchor base indicated generally at 62 is mounted in an upright position instead of an inclined position as shown in FIG. 2. Third, the connecting bracket indicated generally at 63 differs from connecting bracket 10 of FIGS. 1–5 in having four support and locator pins 64—64 instead of the three pins 24 of bracket 10 (FIG. 3).

The flanges 65—65 on the anchor base 62 have co-planar top surfaces or edges 66 on one of which a pair of the pins 64 rest (FIG. 15) and on the other of which the in-turned lip 67 of the bracket 63 rests (FIG. 16). The bracket 63 is permanently secured in place on opposite sides of the anchor base 62 by the welds W—W. The assembly shown in FIG. 15 is a right hand assembly. It will be seen that a left hand assembly may be made by mounting the bracket 63 so that the unused pair of pins 64 in FIG. 15 rest on a top flange surface or edge 66.

The elongated opening 68 in the top of bracket 63 allows a bolt 70 to be inserted as illustrated in FIG. 3. The end of the shank of the tilted bolt passes upwardly through the opening 68 and then vertically upward through the hole 71 in the leg 61. Thereafter, the bolt 70 is set leaving the collar 72 swedged to the bolt shank. One pair of the vertical edges 73—73 on the bracket 63 engage or are juxtaposed to the inner surface 74 of the leg 75 as shown in FIG. 15 thereby preventing appreciable twisting movement of the bracket 63 within the right angle structural part 60. The location and dimension of the elongated opening 68 are such that the shank of the bolt 70 engages one end of the opening 68 thereby preventing shifting of the bracket 63 away from the leg 75. The hole 71 in the leg 61 prevents shifting of the bolt 70. Hence, the entire assembly, including the pipe 7 is rigidly and permanently secured in place.

What is claimed is:

1. In combination, one-piece pipe anchor base and permanently fastened thereto a bracket for mounting the pipe anchor base to the inside of a right angle structural part having a bolt receiving hole extending through one leg thereof, said pipe anchor base comprising, a longitudinally extending pipe receiving saddle portion in the interior of which a longitudinally extending pipe may be seated and clamped by means of an interengaging wedge clamp, a pair of spaced transversely extending flanges adjacent the opposite ends of said saddle portion, and longitudinally extending wedge clamp receiving and retaining flanges projecting laterally on opposite sides of said saddle portion, and said bracket being interfittable within said right angle structural part and having a first portion which fits flatwise against the inside of said one leg of said right angle structural part and a second portion which is juxtaposed to or engages the inside of the other leg of said right angle structural part, said first portion of said bracket having a single elongated bolt receiving opening therein elongated in at least one direction and an end portion of which is registrable with said bolt receiving hole in said one leg of said right angle structural part, whereby upon tightening a bolt extending through said hole and said portion of said elongated opening registrable with said hole said bracket is retained against appreciable movement relative to said right angle structural part, and said anchor base and the pipe clamped therein are by means of said bracket anchored to said right angle structural part.

2. The combination called for in claim 1, wherein said bracket is fastened to said anchor base by welds extending along the outer sides of said pair of transversely extending flanges.

3. The combination called for in claim 1, wherein said anchor base is fastened to said bracket in a tilted orientation.

4. A system for anchoring a pipe to the inside of an elongated right angle structural part having a plurality of spaced bolt-receiving holes extending through one leg thereof comprising, a plurality of one-piece pipe anchor bases each of which has permanently fastened thereto a bracket for mounting each pipe anchor base to the inside of said right angle structural part at one of said bolt-receiving holes therein, each said pipe anchor base comprising, a longitudinally extending pipe receiving saddle portion in the interior of which a longitudinally extending pipe may be seated and clamped by means of an interengaging wedge clamp, a pair of spaced transversely extending flanges adjacent the opposite ends of said saddle portion, and longitudinally extending wedge clamp receiving and retaining flanges projecting laterally on opposite sides of said saddle portion, and each said bracket being interfittable within said right angle structural part and having a first portion which fits flatwise against the inside of said one leg of said right angle structural part and a second portion which is juxtaposed to or engages the inside of the other leg of said right angle structural part, said first portion of said bracket having a single bolt receiving opening therein elongated in at least one direction and an end portion of which is registrable with one of said bolt receiving holes in said one leg of said right angle structural part, whereby upon tightening a bolt extending through said hole and said portion of said elongated opening registrable with said hole said bracket is retained against appreciable movement relative to said right angle structural part, and said anchor base and the pipe clamped therein are by means of said bracket anchored to said right angle structural part.

5. The system called for in claim 4, wherein each said bracket is fastened to a said anchor base by welds extending along the outer sides of said pair of transversely extending flanges.

6. The system called for in claim 4, wherein each said anchor base is fastened to a said bracket in a tilted orientation.

* * * * *